US012249304B2

(12) United States Patent
Mao

(10) Patent No.: US 12,249,304 B2

(45) Date of Patent: Mar. 11, 2025

(54) COLLAPSIBLE MUSICAL INSTRUMENT STAND

(71) Applicant: Liqun Mao, Shenzhen (CN)

(72) Inventor: Liqun Mao, Shenzhen (CN)

(73) Assignee: Liqun Mao, Shenzen (CN)

( * ) Notice: Subject to any disclaimer, the term of this patent is extended or adjusted under 35 U.S.C. 154(b) by 252 days.

(21) Appl. No.: 17/951,686

(22) Filed: Sep. 23, 2022

(65) Prior Publication Data

US 2024/0105150 A1 Mar. 28, 2024

(51) Int. Cl.
*G10G 5/00* (2006.01)

(52) U.S. Cl.
CPC ..................................... *G10G 5/00* (2013.01)

(58) Field of Classification Search
CPC ................................ G10G 5/00; G10G 5/005
See application file for complete search history.

(56) References Cited

U.S. PATENT DOCUMENTS

2008/0028912 A1* 2/2008 Sawhney ................ G10G 5/00 84/327

* cited by examiner

*Primary Examiner* — Kimberly R Lockett

(74) *Attorney, Agent, or Firm* — Scarinci Hollenbeck; Libby Babu Varghese

(57) ABSTRACT

A collapsible musical instrument stand has three legs that are rotatably connected by a central hinge. In an open position, two legs are opposite a back leg creating a stable support to receive a musical instrument of any width. When the stand is in a closed position, the legs collapse over each other providing a flat profile.

9 Claims, 3 Drawing Sheets

COLLAPSIBLE MUSICAL INSTRUMENT STAND

PRIORITY CLAIM

N/a

Field of the Invention

The present disclosure is directed to musical instrument stands, specifically collapsible musical instrument stands that can hold musical instruments regardless of width.

BACKGROUND OF THE INVENTION

Musicians use a variety of devices for safety holding music instruments. Some devices may be wall mounted devices that are permanently affixed to a wall. Certain devices are stands that are meant to be permanently placed in a room. Stand can be useful to store instrument when they not being used. Stands should be able to fit guitars of any width and size. Stands should hold the instrument safely without allowing the instrument to topple over, get scratched and simultaneously allowing the instrument to be easily retrieved.

Compact stands exist to be easy to carry and used anywhere. Certain stands are portable and used on the go. Though compact guitar or musical stands exist there is a need for stands to be easily transportable and have a low profile when closed. There is also a need for the stand to be compact and able to withstand the weight of musical instruments regardless of size and width. What is needed is a collapsible musical instrument stand. One that is lightweight, sturdy, able to hold guitars of any width and weight. The stand should be able to pivot from an open position to a closed, collapsed position.

SUMMARY OF THE INVENTION

A collapsible musical instrument stand comprising three legs that are rotatably positionable from a closed, collapsed position into an open position to support a musical instrument. Each leg is generally L-shaped having a vertical section and a horizontal section. A receiver is disposed on the vertical sections of each leg and the receivers rotatably connect each leg.

Each leg is rotatably connected, in some instances the connection may be by a central hinge. The hinge may comprise the receivers, being female receivers, accepting a male post. In the closed position all legs collapse on each other. For instance, the front legs collapse, over the back leg or the back leg can collapse on either front leg creating a flat, compact, collapsed profile.

In the open position two legs are the front legs and the third leg is the back leg creating a stable support to hold the musical instrument. Each the front legs have a back brace on the vertical sections and a stepped landing on the horizontal sections. The back brace is positioned opposite the receiver on the vertical section. The stepped landing includes an upper landing with an upper stopper and a lower landing with a lower stopper. The stepped landing is dimensioned and configured to a body of a musical instrument regardless of width. Each the upper and lower stopper can be angled to abut the body of the musical instrument.

Also provided is a method for opening or collapsing a musical instrument stand, by providing a musical instrument stand, said stand comprising a pair of front legs, and a back leg, each said front leg and said back leg having a vertical section, a horizontal section and a receiver disposed on the vertical section of each of said leg, wherein the receiver of the back leg is connected with the receivers of the front legs. The back leg is rotated a distance from each said front leg and each said front leg is rotated a distance from each other when said stand is in an open position capable of supporting a musical instrument. The stand in a closed, collapsed position is provided by rotating each said front leg to abuttingly flank sides of said back leg such that said back leg is between said front legs. In this closed, collapsed position the stand has a low, compact profile.

DETAILED DESCRIPTION OF THE INVENTION

Figure 1:
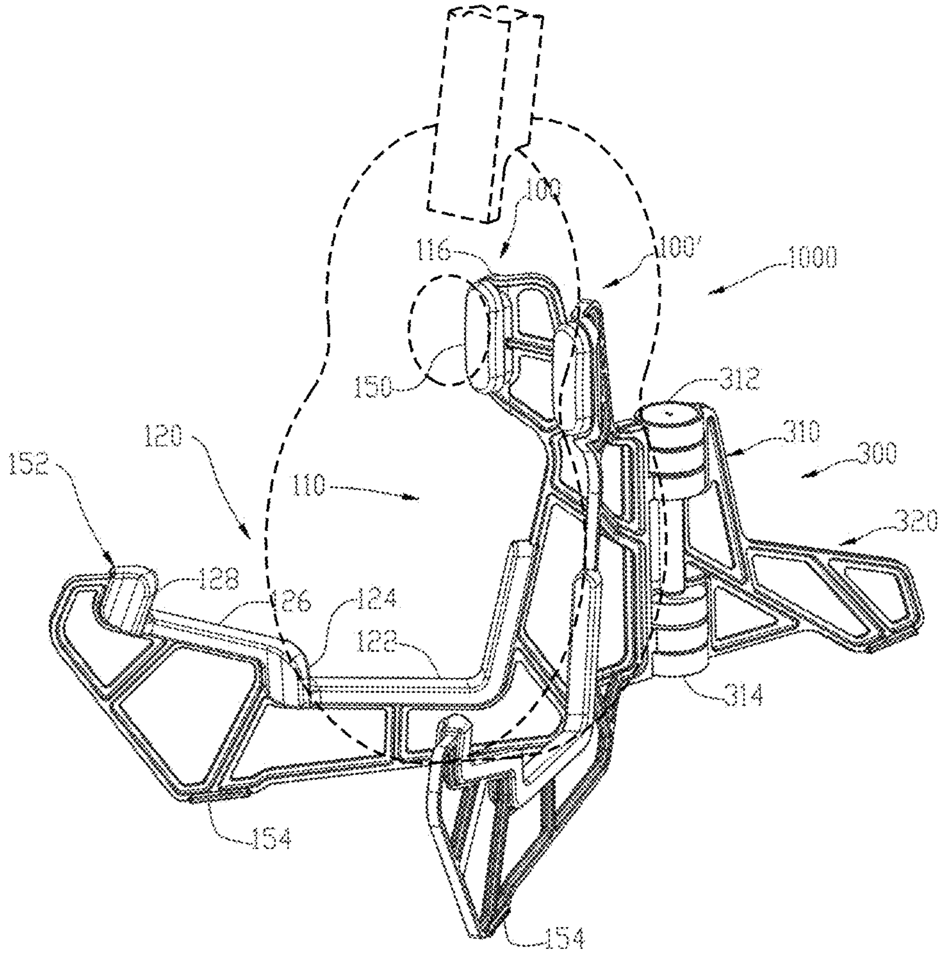
FIG. 1 shows a collapsible musical instrument stand of the present invention in an open position.
Figure 2:
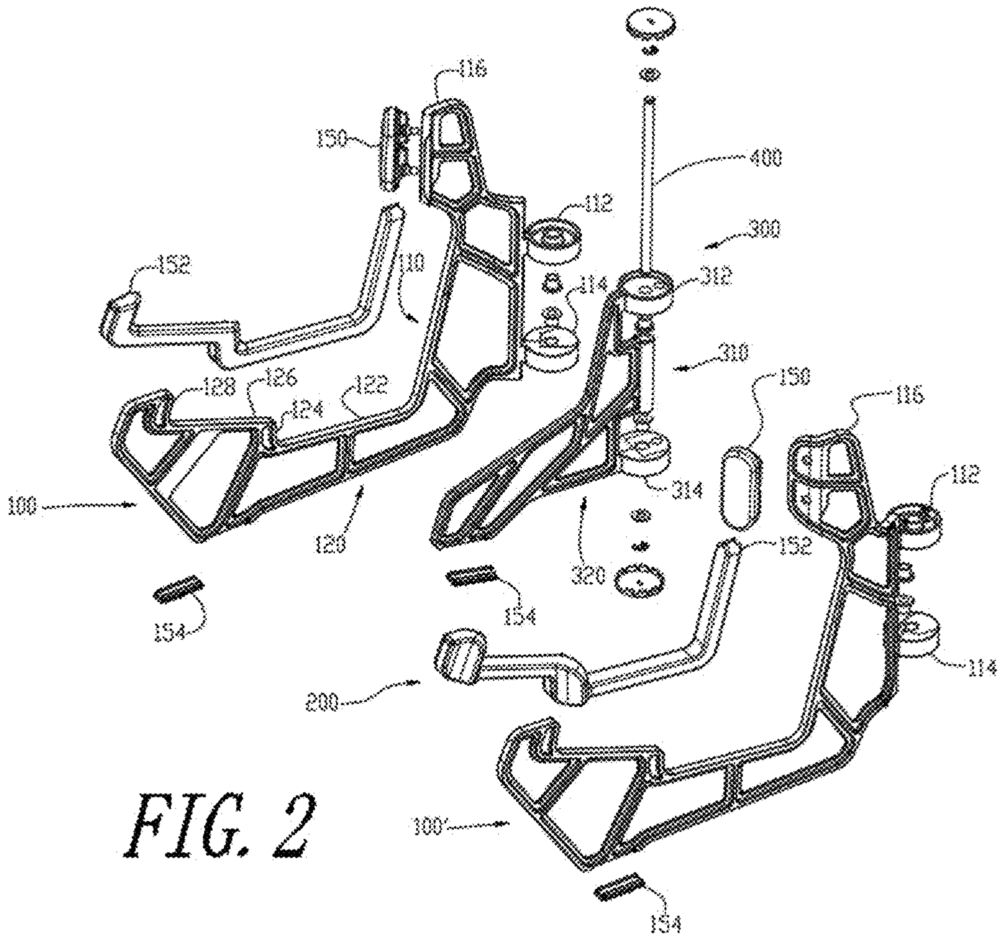
FIG. 2 shows the stand in an exploded.
Figure 3:
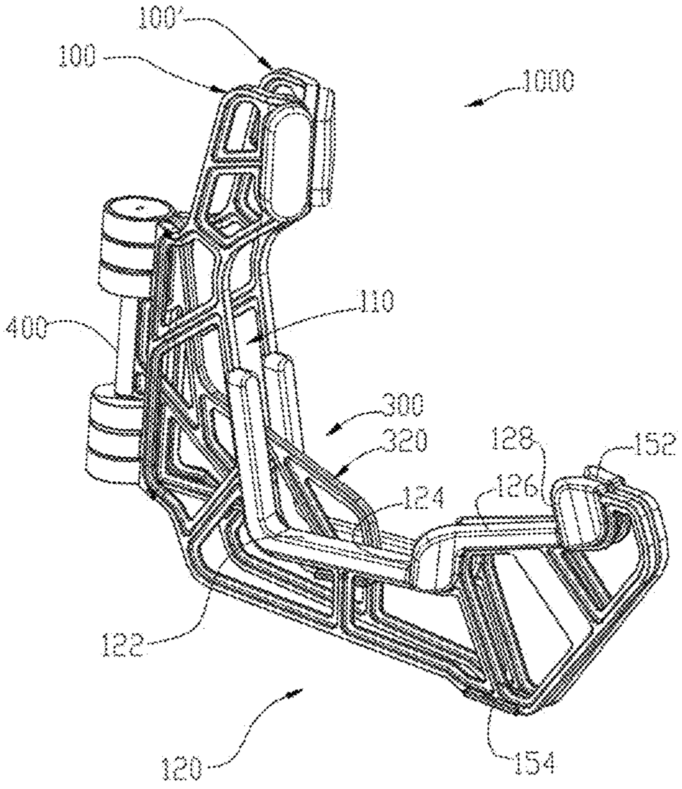
FIG. 3 shows the stand in a closed position.

FIG. 1 shows a collapsible musical instrument stand 1000 in an open position. The stand 1000 comprises a pair of front legs 100 and 100' and a back leg 300. See exploded stand 1000 in FIG. 2. The front legs include a first leg 100 and a second leg 100'. Since parts on leg 100 are similar to the parts on leg 100' the number of parts on legs 100, 100' are identical. The legs 100, 100' and 300 each have a vertical section and a horizontal section. In some embodiments, the legs 100, 100' and 300 are generally L-shaped having a vertical section and a horizontal section Each leg 100, 100' has a vertical section 110 and a horizontal section 120. The vertical section 110 includes receivers such as top receiver 112 and bottom receiver 114 and opposite the receivers 112, 114 is a back brace 116.

The horizontal section 120 on the front legs 100, 100' include a stepped landing comprising a lower landing 122 with a lower stopper 124, an upper landing 126 with an upper stopper 128. In one embodiment, each the upper stopper 128 and lower stopper 124 can be angled to abut the body of the musical instrument that will be held in the musical instrument stand 1000. In another embodiment, each the upper stopper 128 and lower stopper 124 are contoured to secure a front surface of the musical instrument. The stepped landing is dimensioned and configured to a body of a musical instrument regardless of width. For instance, a musical instrument having a narrow width may be dimensioned and configured to sit in the lower landing 122 and a front part of the musical instrument will touch the lower stopper 124 while a rear surface of the musical instrument will touch the back brace 116. A wider musical instrument will need more room and would be suited to reside in the upper landing 126 with the front of the musical instrument body abutting the upper stopper 128 and the rear surface of the musical instrument body touching the back brace 116. Protective material 150, 152 may be placed at the back brace 116 and on the stepped landing to cushion the musical instrument. Examples of protective material may include but no be limited to cork, rubber and certain plastics. Protective material 154 may also be placed under each leg 100, 100', 300.

The rear leg 300 has a horizontal section 320 and a vertical section 310 including receivers 312, 314. The receivers 312, 314 of the rear legs 300 connect with the receivers 112, 114 of the front legs 100, 100'. The legs 100, 100' 300 may be rotatably connected, in some instances the connection may be by a central hinge. The hinge may comprise the receivers of each leg accepting a male post 400. Each of the receivers 112, 114, of legs 100 and 100' and receivers 312, 314 of leg 300 may be female to receive the post 400. The legs 100, 100' and 300 are rotatably positionable from an open position to a closed position.

In the open position legs 100, 100' are opposite the leg 300 creating a stable support to hold the musical instrument. See FIG. 1. In the closed position all legs 100, 100' and 300 collapse on each other. For instance, the front legs 100, 100' collapse, over the back leg 300 or the back leg 300 can collapse on either front leg 100, 100' creating a flat, compact, collapsed profile for the stand 1000.

While specific embodiments of the invention have been described and illustrated, such embodiments should be considered illustrative of the invention only and not as limiting the invention as construed in accordance with the accompanying claims. One of ordinary skill in the art could alter the above embodiments or provide insubstantial changes that may be made without departing from the scope of the invention.

I claim:

1. A collapsible musical instrument stand, comprising:

a pair of front legs, each said front leg has a vertical section, a horizontal section and a receiver disposed on the vertical section of each of said front leg; and a back leg, said back leg having a vertical section, a horizontal section, and a receiver disposed on the vertical section of the back leg, wherein the receiver of the back leg is connected with the receivers of the front legs wherein the front legs and the back leg are each positionable from a closed, collapsed position to an open position that is capable of supporting a musical instrument, wherein each the front legs have a back brace on the vertical section, said brace is opposite the receiver, said back brace is dimensioned and configured to support a musical instrument, wherein each the front legs have a landing on the horizontal section and a stopper, wherein the stopper is dimensioned and configured to support the musical instrument, and wherein the landing has a lower landing and the stopper is a lower stopper.

2. The stand of claim 1, wherein the front legs and the back legs are rotatably connected.

3. A collapsible musical instrument stand, comprising:

a pair of front legs, each said front leg has a vertical section, a horizontal section and a receiver disposed on the vertical section of each of said front leg; and a back leg, said back leg having a vertical section, a horizontal section, and a receiver disposed on the vertical section of the back leg, wherein the receiver of the back leg is connected with the receivers of the front legs wherein the front legs and the back leg are each positionable from a closed, collapsed position to an open position that is capable of supporting a musical instrument, wherein in the open position, the front legs are positioned opposite the back leg creating a stable support and in the closed position the front legs collapse, over the back leg creating a collapsed profile.

4. The stand of claim 1, wherein the landing has an upper landing and the stopper is an upper stopper.

5. The stand of claim 1, wherein the stopper is angled.

6. The stand of claim 1, wherein each said receivers are pivotably connected to each other.

7. The stand of claim 1, wherein the vertical section and the horizontal section of each of said front legs form a generally L-shape.

8. The stand of claim 1, wherein the vertical section and the horizontal section of said back leg forms a generally L-shape.

9. A method for opening or collapsing a musical instrument stand, comprising providing a musical instrument stand, said stand comprising a pair of front legs, and a back leg, each said front leg and said back leg having a vertical section, a horizontal section and a receiver disposed on the vertical section of each of said leg, wherein the receiver of the back leg is connected with the receivers of the front legs, rotating said back leg a distance from each said front leg and rotating each said front leg a distance from each other when said stand is in an open position capable of supporting a musical instrument; and rotating each said front leg to abuttingly flank sides of said back leg, wherein said back leg is between said front legs when said stand is in a closed, collapsed position, wherein said stand in said closed, collapsed position provides a low profile.

* * * * *